US006990317B2

(12) United States Patent
Arnold

(10) Patent No.: US 6,990,317 B2
(45) Date of Patent: Jan. 24, 2006

(54) INTERFERENCE RESISTANT WIRELESS SENSOR AND CONTROL SYSTEM

(75) Inventor: Kenneth David Arnold, Poway, CA (US)

(73) Assignee: Wireless Innovation, San Diego, CA (US)

( * ) Notice: Subject to any disclaimer, the term of this patent is extended or adjusted under 35 U.S.C. 154(b) by 199 days.

(21) Appl. No.: 10/157,217

(22) Filed: May 28, 2002

(65) Prior Publication Data

US 2003/0224729 A1 Dec. 4, 2003

(51) Int. Cl.
*H04B 7/00* (2006.01)
(52) U.S. Cl. .................. 455/59; 455/101; 455/103; 370/345; 370/478; 375/299
(58) Field of Classification Search .................. 455/59, 455/60, 61, 101, 102, 103, 132; 370/478, 370/345; 375/299, 347
See application file for complete search history.

(56) References Cited

U.S. PATENT DOCUMENTS

| | | |
|---|---|---|
| 2,395,850 A | 3/1946 | Colman |
| 2,928,900 A | 3/1960 | Pawley |
| 2,929,051 A | 3/1960 | Pawley |
| 3,228,278 A | 1/1966 | Wortman |
| 3,281,837 A | 10/1966 | Van Hijfte |
| 3,316,488 A | 4/1967 | Reynolds |
| 3,333,272 A | 7/1967 | Deming |
| 3,339,141 A | 8/1967 | Rothenbuhler et al. |
| 3,363,250 A | 1/1968 | Jacobson |
| 3,372,393 A | 3/1968 | Cataldo |
| 3,436,486 A | 4/1969 | Stevens |
| 3,522,536 A | 8/1970 | Reynolds |
| 3,534,266 A | 10/1970 | Halstead |
| 3,614,620 A | 10/1971 | David |
| 3,651,407 A | 3/1972 | Sarallo et al. |
| 3,668,560 A | 6/1972 | Padalino et al. |
| 3,762,601 A | 10/1973 | McLaughlin |
| 3,764,912 A | 10/1973 | Abraham et al. |
| 3,831,175 A | 8/1974 | Mazalas |
| 3,835,454 A | 9/1974 | Palmieri et al. |
| RE29,525 E | 1/1978 | Willmott |
| 4,091,361 A | 5/1978 | Eichelberger et al. |
| 4,169,286 A | 9/1979 | Uzunoglu et al. |
| 4,178,549 A | 12/1979 | Ledenbach et al. |
| 4,218,681 A | 8/1980 | Hörmann |
| 4,315,249 A | 2/1982 | Apple et al. |
| 4,338,526 A | 7/1982 | Martin et al. |
| 4,360,801 A | 11/1982 | Duhame |
| 4,404,558 A | 9/1983 | Yen |
| 4,638,433 A | 1/1987 | Schindler |

(Continued)

FOREIGN PATENT DOCUMENTS

JP 57-210797 12/1982

(Continued)

*Primary Examiner*—Lee Nguyen
(74) *Attorney, Agent, or Firm*—DLA Piper Rudnick Gray Cary US LLP

(57) ABSTRACT

A wireless sensor and control system includes wireless RF transmitter units and one or more receivers that communicate using more than one narrowband radio channel to provide increased reliability in the presence of unintentional radio interference. The output of a sensor transducer or closure of a switch contact can trigger transmissions at two or more narrowband carrier frequencies that are subsequently decoded by the receiver(s). The remote sensor data can then be passed to another system for processing and/or utilized to control remote devices. In accordance with one practical embodiment, the remote sensor data indicates the ingress or egress of monitored product inventory.

11 Claims, 10 Drawing Sheets

U.S. PATENT DOCUMENTS

| | | | |
|---|---|---|---|
| 4,717,042 A | 1/1988 | McLaughlin |
| 4,750,118 A | 6/1988 | Heitschel et al. |
| 4,785,969 A | 11/1988 | McLaughlin |
| 4,794,622 A | 12/1988 | Isaacman et al. |
| 4,806,930 A | 2/1989 | Wojciak, Jr. |
| 4,881,148 A | 11/1989 | Lambropoulos et al. |
| 4,893,240 A | 1/1990 | Karkouti |
| 4,988,992 A | 1/1991 | Heitschel et al. |
| 5,014,875 A | 5/1991 | McLaughlin et al. |
| 5,109,221 A | 4/1992 | Lambropoulos et al. |
| 5,223,818 A | 6/1993 | Polo |
| 5,263,596 A | 11/1993 | Williams |
| 5,289,157 A | 2/1994 | Rudick et al. |
| 5,314,243 A | 5/1994 | McDonald et al. |
| 5,319,797 A | 6/1994 | Salter et al. |
| 5,346,297 A | 9/1994 | Colson, Jr. et al. |
| 5,392,951 A | 2/1995 | Gardner et al. |
| 5,405,048 A | 4/1995 | Rogers et al. |
| 5,406,274 A | 4/1995 | Lambropoulos et al. |
| 5,431,299 A | 7/1995 | Brewer et al. |
| 5,442,340 A | 8/1995 | Dykema |
| 5,445,294 A | 8/1995 | Gardner et al. |
| 5,460,294 A | 10/1995 | Williams |
| 5,479,155 A | 12/1995 | Zeinstra et al. |
| 5,485,486 A | 1/1996 | Gilhousen et al. |
| 5,493,695 A | 2/1996 | Aitkenhead et al. |
| 5,502,944 A | 4/1996 | Kraft et al. |
| 5,504,783 A | 4/1996 | Tomisato et al. |
| 5,506,717 A | 4/1996 | Kho |
| 5,520,450 A | 5/1996 | Colson, Jr. et al. |
| 5,528,025 A | 6/1996 | Swintek |
| 5,534,865 A | 7/1996 | Kriegsman et al. |
| 5,537,313 A | 7/1996 | Pirelli |
| 5,541,571 A | 7/1996 | Ochs et al. |
| 5,542,107 A | 7/1996 | Kay |
| 5,546,394 A | 8/1996 | Eaton et al. |
| RE35,364 E | 10/1996 | Heitschel et al. |
| 5,564,101 A | 10/1996 | Eisfeld et al. |
| 5,564,803 A | 10/1996 | McDonald et al. |
| 5,574,466 A | 11/1996 | Reed et al. |
| 5,577,265 A | 11/1996 | Wheatley, III |
| 5,583,485 A | 12/1996 | Van Lente et al. |
| 5,592,169 A | 1/1997 | Nakamura et al. |
| 5,592,481 A | 1/1997 | Wiedeman et al. |
| 5,611,051 A | 3/1997 | Pirelli |
| 5,614,885 A | 3/1997 | Van Lente et al. |
| 5,614,891 A | 3/1997 | Zeinstra et al. |
| 5,614,914 A | 3/1997 | Bolgiano |
| 5,619,190 A | 4/1997 | Duckworth et al. |
| 5,619,191 A | 4/1997 | Lambropoulos et al. |
| 5,625,881 A | 4/1997 | Sandler et al. |
| 5,627,529 A | 5/1997 | Duckworth et al. |
| 5,627,879 A | 5/1997 | Russell et al. |
| 5,629,934 A | 5/1997 | Ghosh et al. |
| 5,646,701 A | 7/1997 | Duckworth et al. |
| 5,657,325 A | 8/1997 | Lou et al. |
| 5,661,455 A | 8/1997 | Van Lente et al. |
| 5,661,804 A | 8/1997 | Dykema et al. |
| 5,661,978 A | 9/1997 | Holmes et al. |
| RE35,650 E | 11/1997 | Partyka et al. |
| 5,684,471 A | 11/1997 | Bernardi et al. |
| 5,686,903 A | 11/1997 | Duckworth et al. |
| 5,686,904 A | 11/1997 | Bruwer |
| 5,689,439 A | 11/1997 | Weerackody et al. |
| 5,691,848 A | 11/1997 | Van Lente et al. |
| 5,699,044 A | 12/1997 | Van Lente et al. |
| 5,699,054 A | 12/1997 | Duckworth |
| 5,699,055 A | 12/1997 | Dykema et al. |
| 5,699,065 A | 12/1997 | Murray |
| 5,708,415 A | 1/1998 | Van Lente et al. |
| 5,712,638 A | 1/1998 | Issa |
| 5,713,485 A | 2/1998 | Liff et al. |
| 5,716,114 A | 2/1998 | Holmes et al. |
| 5,724,666 A | 3/1998 | Dent |
| 5,745,366 A | 4/1998 | Higham et al. |
| 5,748,135 A | 5/1998 | Kriegsman et al. |
| 5,751,072 A | 5/1998 | Kwang |
| 5,752,173 A | 5/1998 | Tsujimoto |
| 5,752,184 A | 5/1998 | Ishimura |
| 5,752,368 A | 5/1998 | Tobe |
| 5,790,409 A | 8/1998 | Fedor et al. |
| 5,790,588 A | 8/1998 | Fukawa et al. |
| 5,790,948 A | 8/1998 | Eisfeld et al. |
| 5,793,300 A | 8/1998 | Suman et al. |
| 5,797,515 A | 8/1998 | Liff et al. |
| 5,799,245 A | 8/1998 | Ohashi |
| 5,805,075 A | 9/1998 | Carlson et al. |
| 5,805,455 A | 9/1998 | Lipps |
| 5,805,456 A | 9/1998 | Higham et al. |
| 5,809,013 A | 9/1998 | Kackman |
| 5,809,470 A | 9/1998 | Monjo |
| 5,812,538 A | 9/1998 | Wiedeman et al. |
| 5,812,931 A | 9/1998 | Yuen |
| 5,812,935 A | 9/1998 | Kay |
| 5,827,180 A | 10/1998 | Goodman |
| 5,832,044 A | 11/1998 | Sousa et al. |
| 5,835,850 A | 11/1998 | Kumar |
| 5,841,390 A | 11/1998 | Tsui |
| 5,841,866 A | 11/1998 | Bruwer et al. |
| 5,842,117 A | 11/1998 | Rosenberg et al. |
| 5,842,976 A | 12/1998 | Williamson |
| 5,845,199 A | 12/1998 | Longshore |
| 5,854,593 A | 12/1998 | Dykema et al. |
| 5,854,994 A | 12/1998 | Canada et al. |
| 5,864,298 A | 1/1999 | Vogel |
| 5,870,155 A | 2/1999 | Erlin |
| 5,872,562 A | 2/1999 | McConnell et al. |
| 5,884,806 A | 3/1999 | Boyer et al. |
| 5,898,397 A | 4/1999 | Murray |
| 5,903,226 A | 5/1999 | Suman et al. |
| 5,903,326 A | 5/1999 | Suman et al. |
| 5,905,653 A | 5/1999 | Higham et al. |
| 5,907,493 A | 5/1999 | Boyer et al. |
| 5,914,933 A | 6/1999 | Cimini et al. |
| 5,927,540 A | 7/1999 | Godlewski |
| 5,933,122 A | 8/1999 | Sauer et al. |
| 5,940,306 A | 8/1999 | Gardner et al. |
| 5,941,867 A | 8/1999 | Kao |
| 5,944,659 A | 8/1999 | Flach et al. |
| 5,945,651 A | 8/1999 | Chorosinski et al. |
| 5,949,796 A | 9/1999 | Kumar |
| 5,960,330 A | 9/1999 | Azuma |
| 5,963,874 A | 10/1999 | Mähler |
| 5,969,774 A | 10/1999 | Wininger |
| 5,970,061 A | 10/1999 | Kokudo |
| 5,971,593 A | 10/1999 | McGrady |
| 5,971,594 A | 10/1999 | Sahai et al. |
| 5,973,756 A | 10/1999 | Erlin |
| 5,978,660 A | 11/1999 | Haquet et al. |
| 5,982,825 A | 11/1999 | Tsujimoto |
| 6,003,006 A | 12/1999 | Colella et al. |
| 6,005,508 A | 12/1999 | Tsui |
| 6,006,075 A | 12/1999 | Smith et al. |
| 6,011,999 A | 1/2000 | Holmes |
| 6,021,317 A | 2/2000 | Irvin |
| 6,021,392 A | 2/2000 | Lester et al. |
| 6,025,786 A | 2/2000 | Rayford |
| 6,029,143 A | 2/2000 | Mosher et al. |
| 6,032,155 A | 2/2000 | de la Huerga |
| 6,049,289 A | 4/2000 | Waggamon et al. |
| RE36,703 E | 5/2000 | Heitschel et al. |
| 6,065,819 A | 5/2000 | Holmes et al. |
| 6,068,156 A | 5/2000 | Liff et al. |
| 6,075,823 A | 6/2000 | Sonoda |

| | | |
|---|---|---|
| 6,078,269 A | 6/2000 | Markwell et al. |
| 6,091,343 A | 7/2000 | Dykema et al. |
| 6,097,995 A | 8/2000 | Tipton et al. |
| 6,108,326 A | 8/2000 | Bruwer |
| 6,108,524 A | 8/2000 | Hershey et al. |
| 6,108,588 A | 8/2000 | McGrady |
| 6,109,774 A | 8/2000 | Holmes et al. |
| 6,111,911 A | 8/2000 | Sanderford, Jr. et al. |
| 6,116,461 A | 9/2000 | Broadfield et al. |
| 6,128,332 A | 10/2000 | Fukawa et al. |
| 6,137,421 A | 10/2000 | Dykema |
| 6,140,938 A | 10/2000 | Flick |
| 6,144,315 A | 11/2000 | Flick |
| 6,151,328 A | 11/2000 | Kwon et al. |
| 6,151,372 A | 11/2000 | Yamamoto |
| 6,151,536 A | 11/2000 | Arnold et al. |
| 6,154,485 A | 11/2000 | Harrison |
| 6,154,544 A | 11/2000 | Farris et al. |
| 6,161,123 A | 12/2000 | Renouard et al. |
| 6,163,737 A | 12/2000 | Fedor et al. |
| 6,166,650 A | 12/2000 | Bruwer |
| 6,170,230 B1 | 1/2001 | Chudy et al. |
| 6,170,929 B1 | 1/2001 | Wilson et al. |
| 6,175,312 B1 | 1/2001 | Bruwer et al. |
| 6,175,779 B1 | 1/2001 | Barrett |
| 6,181,255 B1 | 1/2001 | Crimmins et al. |
| 6,185,258 B1 | 2/2001 | Alamouti et al. |
| 6,185,266 B1 | 2/2001 | Kuchi et al. |
| 6,188,447 B1 | 2/2001 | Rudolph et al. |
| 6,191,701 B1 | 2/2001 | Bruwer |
| 6,195,064 B1 | 2/2001 | Andrews et al. |
| 6,201,801 B1 | 3/2001 | Dent |
| 6,208,911 B1 | 3/2001 | Yamaoka et al. |
| 6,212,242 B1 | 4/2001 | Smith et al. |
| 6,219,587 B1 | 4/2001 | Ahlin et al. |
| 6,243,565 B1 * | 6/2001 | Smith et al. ............... 455/101 |
| 6,246,698 B1 | 6/2001 | Kumar |
| 6,249,673 B1 | 6/2001 | Tsui |
| 6,252,507 B1 | 6/2001 | Gagnon |
| 6,256,290 B1 | 7/2001 | Ramesh |
| 6,256,967 B1 | 7/2001 | Hebron et al. |
| 6,259,372 B1 | 7/2001 | Taranowski et al. |
| 6,259,654 B1 | 7/2001 | de la Huerga |
| 6,267,753 B1 | 7/2001 | Kao |
| 6,272,394 B1 | 8/2001 | Lipps |
| 6,275,991 B1 | 8/2001 | Erlin |
| 6,278,869 B1 | 8/2001 | Lindenmeier et al. |
| 6,283,322 B1 | 9/2001 | Liff et al. |
| 6,292,107 B1 | 9/2001 | Yamaura et al. |
| 6,304,797 B1 | 10/2001 | Shusterman |
| 6,308,294 B1 | 10/2001 | Ghosh et al. |
| 6,314,289 B1 | 11/2001 | Eberlein et al. |
| 6,317,098 B1 | 11/2001 | Andrews et al. |
| 6,317,410 B1 | 11/2001 | Allpress et al. |
| 6,320,514 B1 | 11/2001 | Flick |
| 6,327,299 B1 | 12/2001 | Meszko |
| 6,338,007 B1 | 1/2002 | Broadfield et al. |
| 6,338,664 B1 | 1/2002 | Wong |
| 6,339,732 B1 | 1/2002 | Phoon et al. |
| 6,344,796 B1 | 2/2002 | Ogilvie et al. |
| 6,356,528 B1 | 3/2002 | Lundby et al. |
| 6,360,181 B1 | 3/2002 | Gemmell et al. |
| 6,361,263 B1 | 3/2002 | Dewey et al. |
| 6,370,841 B1 | 4/2002 | Chudy et al. |
| 6,587,453 B1 * | 7/2003 | Romans et al. ............. 370/347 |
| 2001/0023315 A1 | 9/2001 | Flach et al. |
| 2001/0034475 A1 * | 10/2001 | Flach et al. ................. 600/300 |
| 2001/0057254 | 5/2002 | Kurashima et al. |

FOREIGN PATENT DOCUMENTS

| | | |
|---|---|---|
| JP | 05-003593 | 1/1993 |
| JP | 10-308727 | 11/1998 |
| JP | 11-041145 | 2/1999 |

* cited by examiner

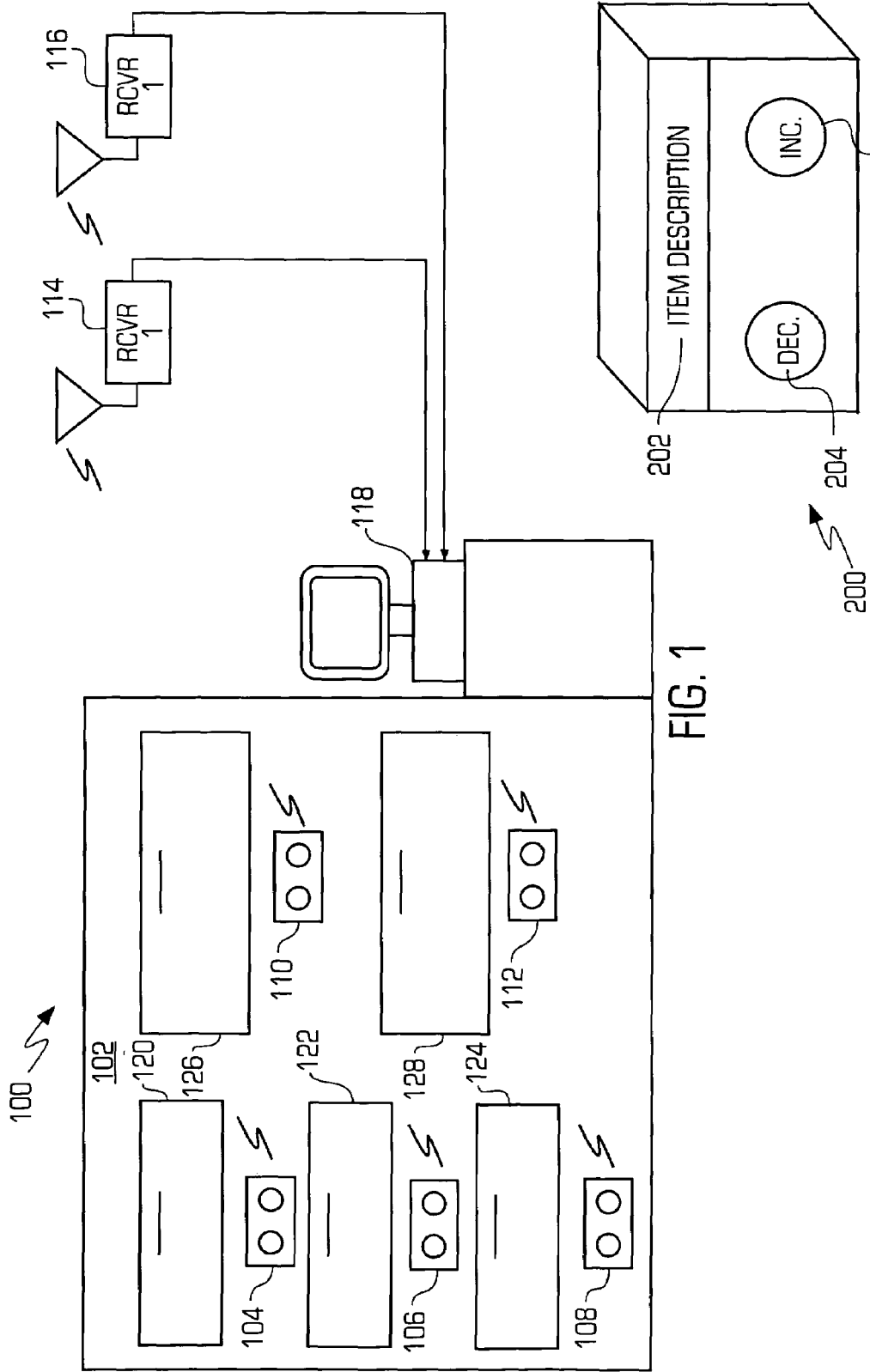

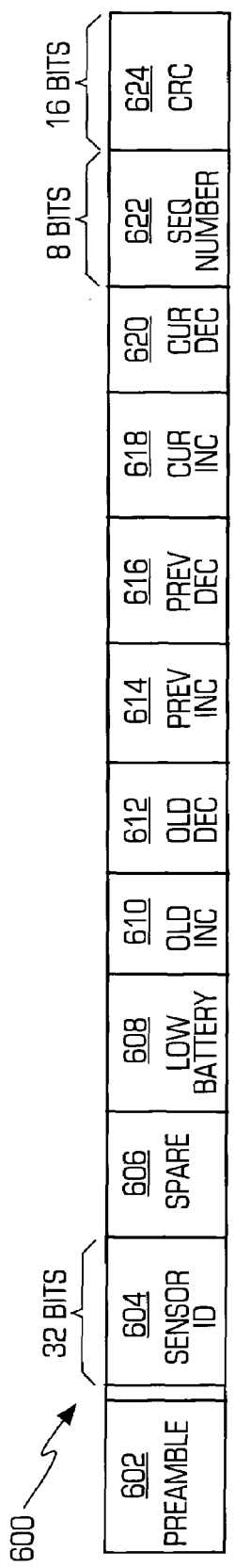

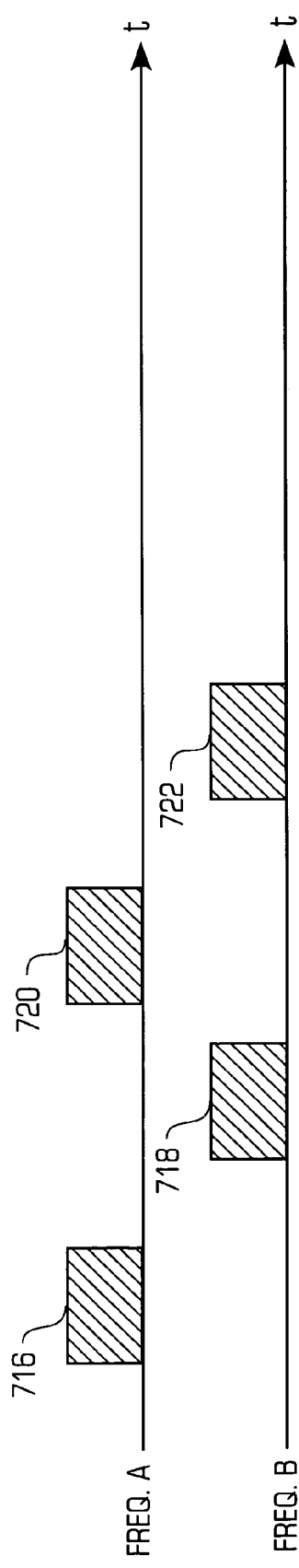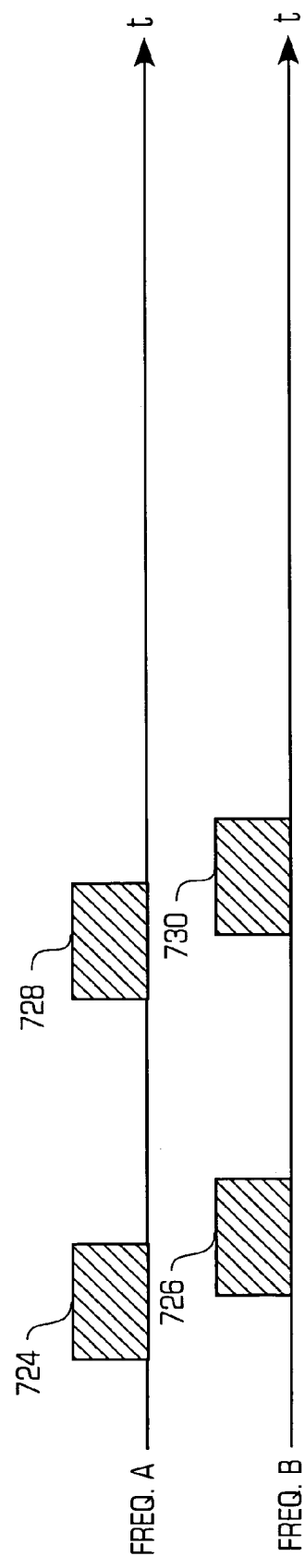

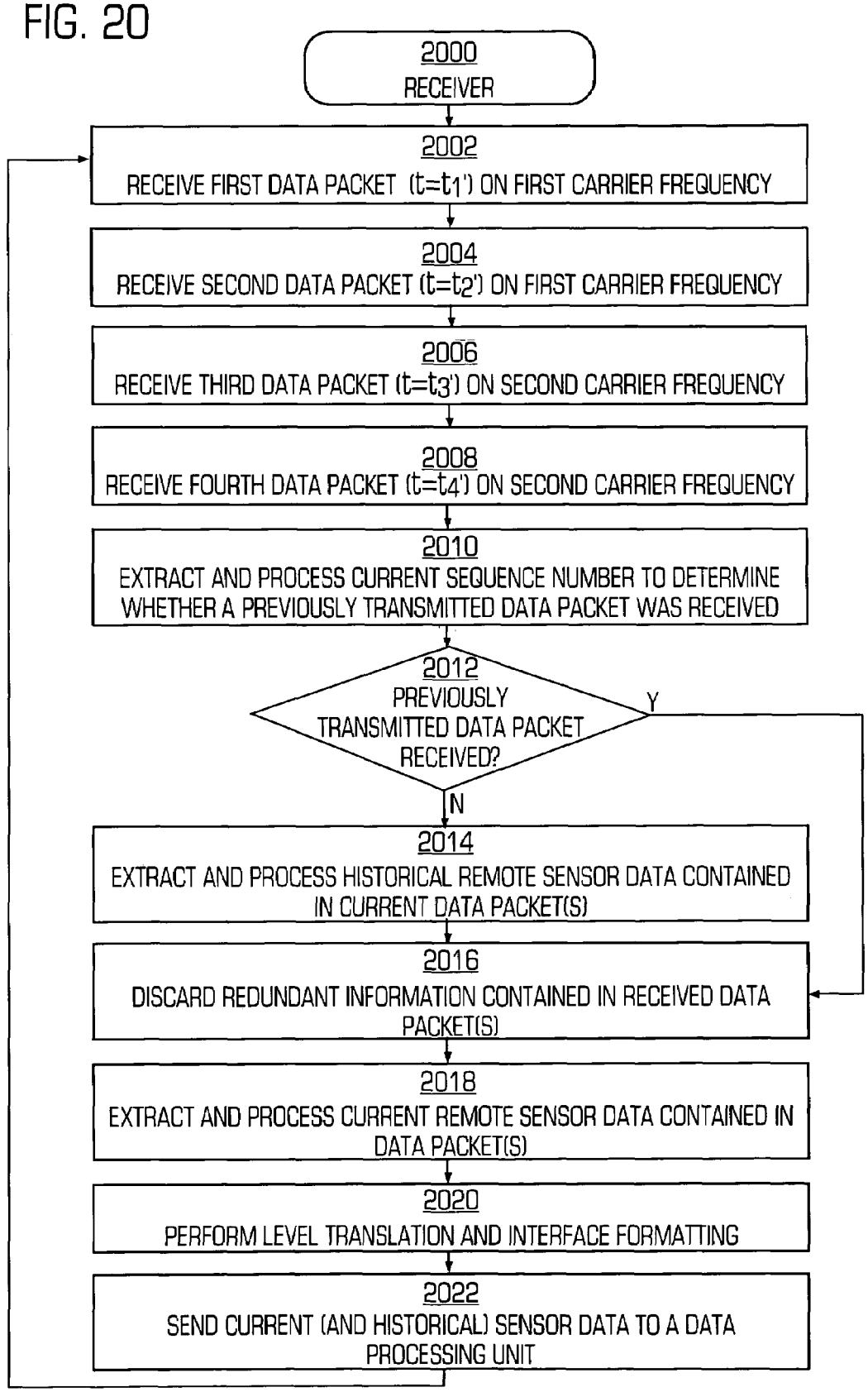

INTERFERENCE RESISTANT WIRELESS SENSOR AND CONTROL SYSTEM

FIELD OF THE INVENTION

The present invention relates generally to wireless data communication techniques. More particularly, the present invention relates to wireless data communication techniques utilized by remote sensor monitoring and control systems.

BACKGROUND OF THE INVENTION

A number of existing wireless sensing and control systems employ narrowband communication techniques to remotely control devices such as garage doors and car alarms. Unfortunately, simple narrowband systems are relatively susceptible to unintentional jamming by spurious and intermittent electromagnetic emissions from other common electronic devices such as computers, medical equipment, and household appliances, rendering them unreliable. In this regard, narrowband or single frequency receivers may be overwhelmed by the ambient noise level, preventing them from receiving the intended transmission.

One known system utilizes an RF carrier that is sequentially modulated at two different audio frequencies to prevent unauthorized control of a garage door opener. Another known remote transmitter device uses multiple RF carrier frequencies in a predetermined sequence to prevent unauthorized control of the destination device. These conventional remote control or sensor transmitter devices do not use multiple frequencies to improve the reliability of receiving the correct signal (or data) in the presence of unintentional interference from other electronic devices. In contrast, such devices employ multiple audio or radio frequencies to improve the security of the system and to prevent unauthorized control.

In the fields of wireless computer and telecommunication systems, spread spectrum systems using direct sequence and frequency hopping have been used to prevent unauthorized interception of the transmitted signal and immunity to intentional jamming. Spread spectrum communication systems spread the information over a wide bandwidth to achieve resistance to interception and intentional jamming of narrowband transmit frequencies. Typical spread spectrum system spread the transmitted signal over a bandwidth that is at least ten times that of the original base-band signal.

While very effective at achieving their intended objectives, existing spread spectrum systems have certain drawbacks. For example, because the transmitted signal is spread over a wide bandwidth, the transmitter and receiver must have an accurately synchronized de-spreading mechanism that is inherently more complex and dissipates more power than the simpler narrowband transmitters and receivers that are typically used for remote control devices. The complicated nature of conventional spread spectrum designs and the associated high power requirements make these designs undesirable for many applications that mandate inexpensive and efficient remote transmitter devices.

The prior art lacks a reliable wireless remote control and sensor system that is relatively immune to unintentional interference from other electronic devices, requires very little operating power, and can be implemented using cost-effective design techniques.

BRIEF SUMMARY OF THE INVENTION

A wireless data transmission system according to the present invention employs multiple narrow band RF carrier frequencies, specific data packet formats, and other techniques that improve the reliability of the system. In accordance with one practical embodiment, the wireless data transmission system includes a plurality of distinct transmitter devices, each of which communicates via a wireless link with one or more receiver units. The receiver unit(s) communicate with a data processing station such as a computer or a computer network. In accordance with one specific embodiment, a product inventory control system employs the wireless data transmission system such that the removal and/or restocking of different products can be monitored.

The above and other aspects of the present invention may be carried out in one form by a wireless data transmission method that involves transmitting a first data packet containing remote sensor data using a first carrier frequency, and transmitting a second data packet containing remote sensor data using a second carrier frequency, where the content of the second data packet is identical to the content of the first data packet.

BRIEF DESCRIPTION OF THE DRAWINGS

A more complete understanding of the present invention may be derived by referring to the detailed description and claims when considered in conjunction with the following Figures, wherein like reference numbers refer to similar elements throughout the Figures.

FIG. 1 is a schematic representation of a product inventory control system that employs remote wireless sensor technology;

FIG. 2 is a perspective view of a wireless data transmitter unit configured for use with a practical embodiment;

FIG. 6 is a diagram of a data packet suitable for use with an example inventory control system;

FIGS. 7–9 depict a transmit sequence of three example data packets;

FIG. 12 is a timing diagram depicting the transmission of data packets at two different alternating carrier frequencies and at distinct times;

FIG. 13 is a timing diagram depicting the transmission of data packets at two different alternating carrier frequencies and at overlapping times;

FIG. 20 is a flow diagram of a receiver process.

DETAILED DESCRIPTION OF A PREFERRED EMBODIMENT

Figure 3:
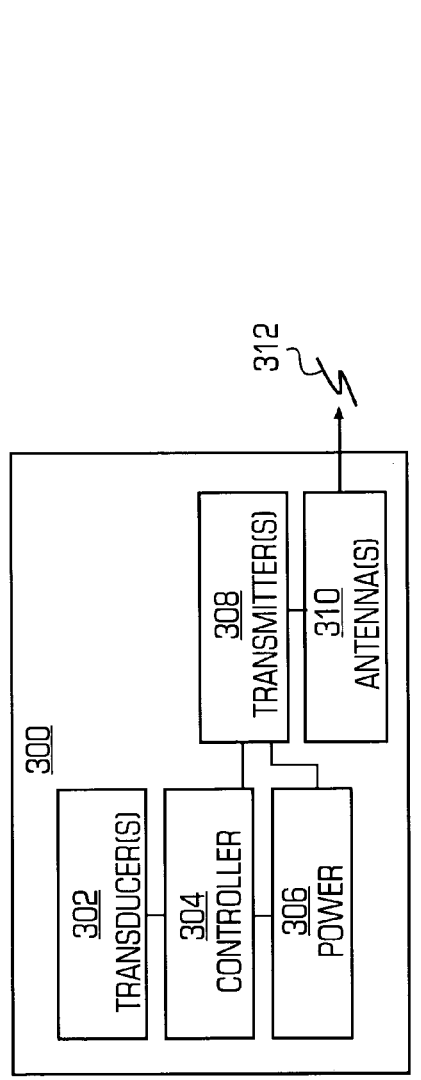
FIG. 3 is a schematic representation of a wireless data transmitter unit configured to transmit sensor data over a wireless link.

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, logic elements, look-up tables, and the like, which may carry out a variety of functions under the control of one or more microprocessors or other control devices. In addition, those skilled in the art will appreciate that the present invention may leverage any number of fundamental RF, microwave, infrared, cellular, or other wireless data transmission techniques and that the system described herein is merely one exemplary application for the invention.

It should be appreciated that the particular implementations shown and described herein are illustrative of the invention and its best mode and are not intended to otherwise limit the scope of the invention in any way. Indeed, for the sake of brevity, conventional techniques for digital data processing, data transmission, sensor design, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical embodiment.

The wireless data transmission and processing techniques described herein can be deployed in a number of practical applications. In general, these techniques relate to the wireless collection of "point of use" remote sensor data from a plurality of distinct wireless transmitter units, each of which corresponds to identifiable event occurrences. The remote sensor data is immediately routed to a central database or processor, which handles the data in substantially real time.

The example embodiment described herein relates to an inventory control system that monitors changes to the inventory of specified items or products. Alternatively, the wireless data transmission and processing techniques can be utilized in the context of: product inspection or quality control systems; security/alarm systems; assembly line monitoring systems; credit card transaction systems; heating and air conditioning systems; garage door openers; flow metering systems; and any number of applications that employ remote sensors, switches, transducers, or the like.

FIG. 1 is a schematic representation of a product inventory control system 100 that employs remote wireless sensors rather than conventional hard-wired sensors. Inventory control system 100 can be utilized to control and monitor the distribution and restocking of items such as medical supplies, pharmaceuticals, electronic components, or the like. Inventory control system 100 generally includes a product storage cabinet 102, one or more wireless data transmitter units (identified by reference numbers 104, 106, 108, 110, and 112), one or more discrete receivers 114/116, and a centralized data processing unit 118. In accordance with one practical embodiment, the components shown in FIG. 1 are located in close proximity to each other, e.g., in the same room, on the same floor of a building, in a warehouse, or in a small office.

Product storage cabinet 102 includes a number of storage areas such as drawers, bins, lockers, or cabinets (identified by reference numbers 120, 122, 124, 126, and 128) for storing different products or items. Each monitored storage area has an associated wireless data transmitter unit: transmitter units 104, 106, 108, 110, and 112 are assigned to storage areas 120, 122, 124, 126, and 128, respectively. Each storage area stores a specific item or product (for example, each storage area can hold products having a common UPC code, serial number, or other identifier), and data processing unit 118 is configured to monitor the inventory of such products.

FIG. 2 is a perspective view of a wireless data transmitter unit 200 configured for use with inventory control system 100. Wireless data transmitter unit 200 is approximately 1.5 inches high, 2.5 inches wide, and 0.5 inches deep, and is preferably realized as a self-contained device capable of operating in a stand-alone manner. In other words, wireless data transmitter unit 200 need not include any external connections for power, data transmission, RF antennas, transducer inputs, control I/O, or the like. Wireless data transmitter unit 200 may include a label or field 202 upon which an item description, bar code number, serial number, or other identifying marking can be placed. For example, the label on one wireless data transmitter unit may read "gloves," and the label on another wireless data transmitter unit may read "laryngeal airways." Wireless data transmitter unit 200 includes two pushbuttons: a "decrement" button 204 and an "increment" button 206. Buttons 204/206 can be implemented with conventional flexible film transducer switches or any suitable electromechanical switching device. A user selects "decrement" button 204 to indicate the removal of inventory from a respective storage area, and selects "increment" button 206 to indicate the addition or restocking of inventory to its respective storage area.

Referring back to FIG. 1, each wireless data transmitter unit is mounted in close proximity to its associated storage area. The wireless data transmitter units can be mounted using double-sided adhesive tape, hook and loop fasteners, glue, screws, magnets, or any suitable mounting device or technique. To ensure accurate inventory assessment, the person removing items from a monitored storage area presses the "decrement" button (on the respective wireless data transmitter unit) once for each item removed. For example, if storage area 120 contains packages of gloves and three packages are removed, the person should press the "decrement" button on wireless data transmitter unit 104 three times. Likewise, if two new packages of gloves are added to storage area 120, the person stocking the gloves should press the "increment" button on wireless data transmitter unit 104 two times.

In response to each button press, the wireless data transmitter unit generates a data packet containing information that identifies the occurrence of the button pressing event. In this regard, each event occurrence detected by a wireless data transmitter unit represents an inventory change for the monitored item corresponding to that transmitter unit. As described below in more detail, each data packet preferably contains two bits of data corresponding to the state of each button (where a "0" indicates an idle state and a "1" indicates that the respective button has been pressed). The wireless data transmitter unit can utilize any number of conventional data encryption techniques to encrypt the data contained in the packet (or any portion thereof). The wireless data transmitter unit transmits identical copies of the data packet using frequency diversity techniques, time diversity techniques, and/or redundancy techniques (described below). In practical embodiments, inventory control system 100 can leverage certain fundamental aspects of known RF communication techniques to perform the wireless data transmission from the wireless data transmitter units to receivers 114/116.

Receivers 114/116 can be configured and located to increase the reliability of the wireless data transmissions. For example, the type of antennas used by receivers 114/116, the antenna polarization, and spatial diversity of the antennas can be selected to optimize the performance of inventory control system 100. Briefly, receiver 114 and/or receiver 116 receives the data packets transmitted by the wireless data transmitter units. In the example embodiment, receiver 114 is tuned or otherwise configured to receive data packets transmitted on a first carrier frequency, while receiver 116 is tuned or otherwise configured to receive identical data packets transmitted on a second carrier frequency. Receivers 114/116 may also be configured to process the information contained in the received data packets (as described in more detail below) and to send such information to data processing unit 118 for subsequent handling. Alternatively, receivers 114/116 may forward the received data packets directly to data processing unit 118 or to one or more intervening components (not shown), for subsequent data extraction, decryption, error correction, data processing, and the like.

Data processing unit 118 can be realized as a stand-alone personal computer, as a computing element integrated with product storage cabinet 102, as a handheld computing device, or the like. In practice, data processing unit 118 utilizes a computer operating system, any number of deployment-specific software applications, a web browser application, and possibly other computer-executable applications. In response to each remote button press, data processing unit 118 generates a suitable notification (e.g., an audible tone, a flashing light, a graphic on a computer screen, or the like) to inform the user that the event has been registered. Data processing unit 118 is configured to receive data indicative of the remote sensor data, e.g., one or more data packets from receiver 114 and/or receiver 116, or data extracted from one or more data packets. Thereafter, data processing unit 118 can handle the associated inventory control data as desired, under the control of one or more suitable inventory control software applications. Thus, for example, if the user removes an item from a storage area, at least the following events will occur: he will press the respective "decrement" button; data processing unit 118 will immediately generate a notification to provide feedback to the user; and data processing unit 118 will handle the received inventory control data in an appropriate manner. Ultimately, inventory control system 100 can facilitate the efficient distribution of monitored items, the analysis of product use, and online reordering.

The following description refers to elements or features as being "connected" or "coupled" together. As used herein, unless expressly stated otherwise, "connected" means that one element/feature is directly or indirectly connected to another element/feature. Likewise, unless expressly stated otherwise, "coupled" means that one element/feature is directly or indirectly coupled to another element/feature. Thus, although the figures depict example arrangements of elements, additional intervening elements, devices, features, or components may be present in an actual embodiment (assuming that the general functionality is not adversely affected).

FIG. 3 is a schematic representation of a wireless data transmitter unit 300 configured to transmit sensor data over a wireless link. In the example embodiment, each of the wireless data transmitter units utilized by inventory control system 100, and wireless data transmitter unit 200, may be configured as shown in FIG. 3. Generally, wireless data transmitter unit 300 includes one or more transducers 302, a controller 304, a power source 306, a transmitter arrangement 308 having one or more RF transmitters, and an antenna structure 310 having one or more antenna elements. As shown in FIG. 3, transducers 302 are coupled to controller 304, controller 304 is coupled to power source 306 and to transmitter arrangement 308, and transmitter arrangement 308 is coupled to power source 306 and to antenna structure 310.

Each transducer 302 may be configured to detect event occurrences and to provide raw transducer signals to controller 304. In some applications, such as thermostats and temperature monitor applications, controller 304 may poll or otherwise initiate the taking of measurements using the sensors/transducers. In such applications, controller 304 may idle in a low power sleep mode to conserve battery power during periods of inactivity. In a practical embodiment, transducer 302 can be any suitably configured device, element, substance, or composition that converts input energy of one form (such as mechanical energy) into output energy of another form (such as electrical energy or an electronic signal). Controller 304, which may be realized as a digital microprocessor or microcontroller, generates or otherwise obtains remote sensor data corresponding to the raw transducer signals and creates digital data packets containing the remote sensor data and other information. Transmitter arrangement 308 processes the data packets for RF transmission at one or more carrier frequencies. In accordance with one practical embodiment, transmitter arrangement 308 is configured to transmit identical data packets at two different RF carrier frequencies. Antenna structure 310, which can be configured to enhance the quality of the RF transmission, propagates the data packets over a wireless link 312.

Figure 4:
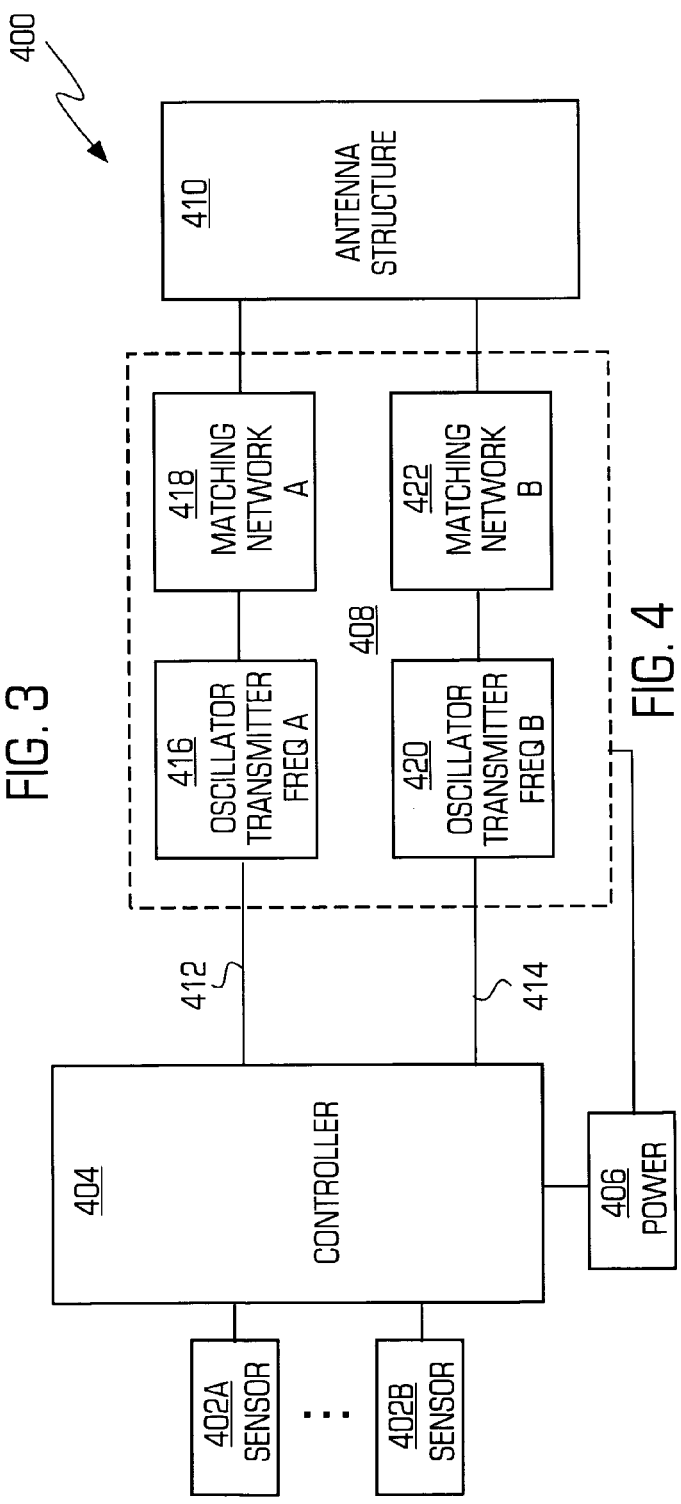
FIG. 4 is a detailed schematic representation of a wireless data transmitter unit configured to transmit sensor data over a wireless link.
Figure 5:
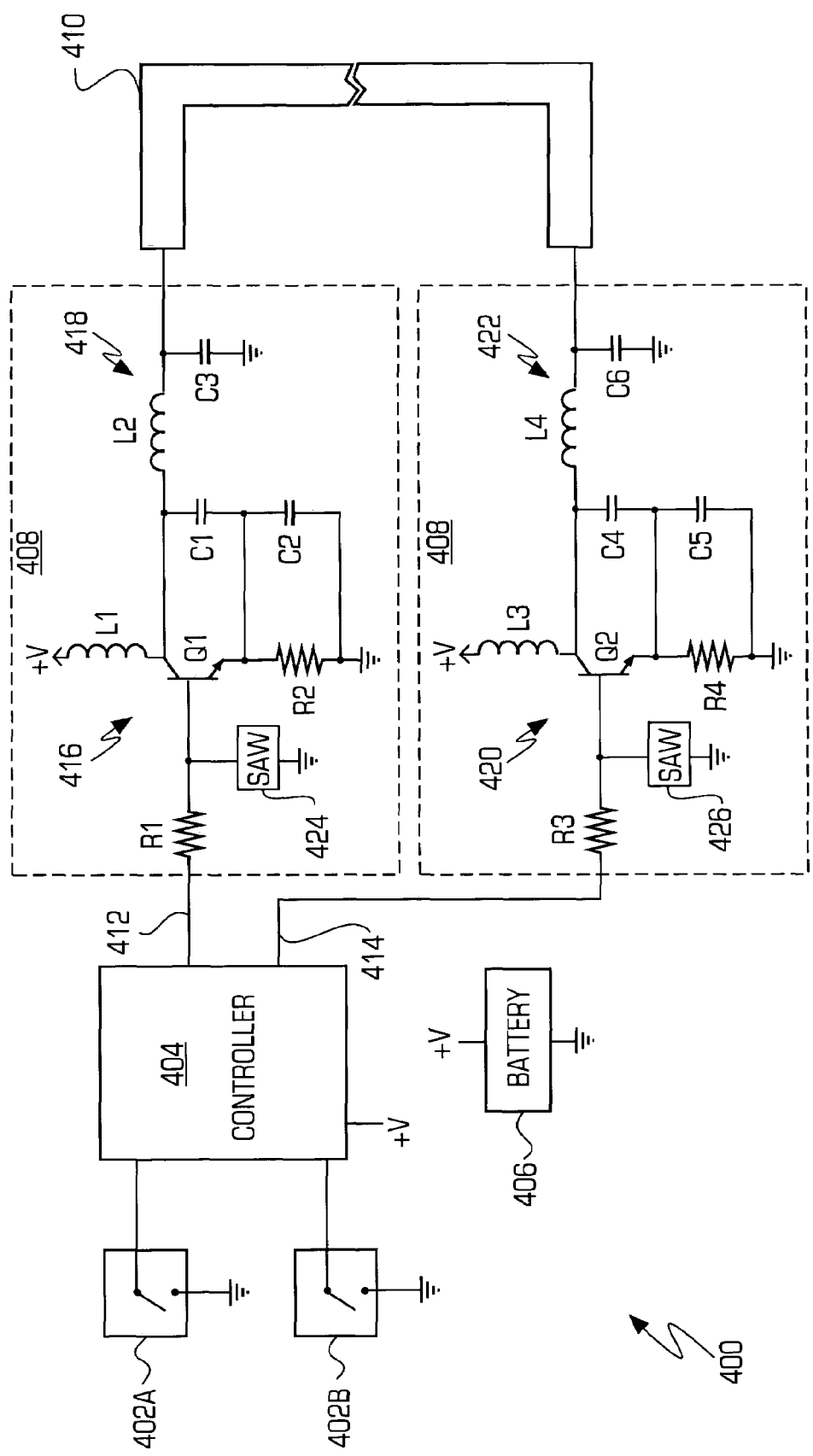
FIG. 5 is another detailed schematic representation of a wireless data transmitter unit configured to transmit sensor data over a wireless link.

FIG. 4 is a detailed schematic representation of a wireless data transmitter unit 400 configured to transmit sensor data over a wireless link, and FIG. 5 is an alternate schematic representation of wireless data transmitter unit 400. Wireless data transmitter unit 400 represents one example embodiment of wireless data transmitter unit 300. Wireless data transmitter unit 400 generally includes a number of sensors 402, a controller 404, a power source 406, a transmitter arrangement 408, and an antenna structure 410. Sensors 402 are coupled to controller 404 such that sensor data obtained by sensors 402 can be received and processed by controller 404. As depicted in FIG. 4, wireless data transmitter 400 can employ any number of sensors 402. In the preferred practical embodiment, however, wireless data transmitter unit 400 employs only two sensors 402, each of which is realized as a switch having one end connected to ground and the other end connected to controller 404 (see FIG. 5). As described above in connection with FIG. 2, sensors 402 may be button switches that react to pressure exerted by the user. In this practical embodiment, an "event occurrence" corresponds to a user's selection of one or both of the button switches.

Briefly, controller 404 obtains the sensor data (or signal) from the sensors and manipulates the data in an appropriate manner to create one or more data packets that contain or otherwise convey the remote sensor data. Controller 404 is coupled to transmitter arrangement 408, which transmits the data packets generated by controller 404. In the example embodiment shown in FIG. 4 and FIG. 5, controller 404 includes one output 412 corresponding to a first transmit channel and another output 414 corresponding to a second transmit channel; transmitter arrangement 408 receives both outputs 412/414. As best shown in FIG. 4, the first transmit channel of transmitter arrangement 408 includes a transmitter 416 and an optional matching network 418. Similarly, the second transmit channel of transmitter arrangement 408 includes a transmitter 420 and an optional matching network 422. Transmitter 416 is suitably configured to transmit (and retransmit) data packets at a first carrier frequency, and transmitter 420 is suitably configured to transmit (and retransmit) data packets at a second carrier frequency. Matching networks 418/422 can be utilized as necessary to improve the impedance match between the respective transmitters 416/420 and antenna structure 410.

In the preferred practical embodiment, antenna structure 410 serves as a common antenna for both transmitter channels. As schematically illustrated in FIG. 5, one transmitter channel drives one end of antenna structure 410, and the other transmitter channel drives the other end of antenna structure 410. In this regard, antenna structure 410 includes at least one "loop" structure coupled between the two transmitter channels. In addition to the loop structure, antenna structure 410 may include any number of additional elements (not shown) that, when combined with the loop structure, form a hybrid electric/magnetic field antenna. To accommodate the preferred self-contained nature of the wireless transmitter unit, antenna structure 410 can be implemented as metal traces on the same printed circuit board that carries the transmitter components.

As depicted in FIG. 5, power source 406 is preferably realized as an integral power supply, e.g., a battery, that provides operating power to at least controller 404 and transmitter arrangement 408. In the example embodiment, power source 406 is a three volt long-life battery having connections to controller 404 and transmitter arrangement 408. Alternatively, power source 406 can be a solar cell, electromagnetic, thermoelectric, or piezoelectric device that converts power from one form into electrical energy that is subsequently stored in an energy reservoir, such as a battery or capacitor, configured to store the energy until needed to power the transmitter unit components.

FIG. 5 depicts example circuit implementations of transmitters 416/420 and matching networks 418/420. Transmitter 416 includes an input resistor R1, a frequency determining element 424, a transistor Q1, an inductor L1, a resistor R2, and capacitors C1/C2. In the illustrated embodiment, frequency determining element 424 is realized as a surface acoustic wave ("SAW") device. Alternatively, frequency determining element 424 may comprise a piezoelectric crystal, a frequency synthesizer, a frequency multiplier, or the like. Although a broad range of carrier frequencies is suitable for use with the transmitters, practical embodiments may use carrier frequencies of 433 MHz, 315 MHz, 303.875 MHz, 418 MHz, and 868 MHz (these frequencies are commonly used in other remote control applications such as garage door openers, and the transmitter/receiver components are readily available and inexpensive to procure). In accordance with one particular implementation, frequency determining element 424 is configured to produce a carrier frequency of 433 MHz, and frequency determining element 426 is configured to produce a carrier frequency of 315 MHz. Matching network 418 includes an inductor L2 and a capacitor C3. The specific component values utilized by transmitter 416 are selected based upon the chosen carrier frequencies, component characteristics, and parasitic electrical characteristics of the circuit board upon which the components are mounted. The specific component values utilized by matching network 418 are selected to match the output impedance of transmitter 416 to the input impedance of antenna structure 410. Table 1 lists the values of the components shown in FIG. 5 for an example embodiment.

TABLE 1

| Example Component Values | |
|---|---|
| Component | Value |
| C1 | 10 pF |
| C2 | 12 pF |
| C3 | 5 pF |
| C4 | 10 pF |
| C5 | 12 pF |
| C6 | 5 pF |
| L1 | 10 nH |
| L2 | 12 nH |
| L3 | 10 nH |
| L4 | 12 nH |
| R1 | 18 kΩ |
| R2 | 100 Ω |
| R3 | 18 kΩ |
| R4 | 100 Ω |

The practical design and operation of the transmitters and matching units can utilize any number of known techniques. The specifics of such designs are well documented and, accordingly, are not described in detail herein.

In an alternate embodiment (not shown), wireless data transmission unit 400 may utilize a single transmitter configured to transmit data packets on a plurality of different carrier frequencies. In this regard, a single transmitter may employ a switched frequency determining element or a digital frequency synthesizer capable of generating a plurality of different carrier frequencies. The frequencies may be changed by the use of electronic switches that select one out of a plurality of frequency determining elements. The switches may be realized as semiconductor switches, diodes, bipolar junction transistors, field effect transistors, electromechanical elements, or the like. Such an embodiment may also utilize matching elements or networks that can be controlled to adapt the antenna structure for operation at different frequencies.

The wireless data transmission units can format and transmit the remote sensor data in any suitable manner. The example embodiment described herein, however, utilizes digital data packets as the vehicle by which the remote sensor data is transmitted between the wireless data transmission units and the receivers. As mentioned above, the controller of each wireless data transmitter unit creates the data packets under the control of defined software instructions. FIG. 6 is a diagram of a data packet 600 suitable for use with an example inventory control system. Data packet 600 represents only one of many possible data packet formats that can be utilized for the transmission of remote sensor data, and the following description of data packet 600 is not intended to limit or restrict the scope of the present invention in any way.

Data packet 600 includes a preamble 602, a transmitter unit identifier (i.e., sensor ID) 604, one or more spare bits 606 which can be reserved for future uses, a "low battery" bit 608 which is flagged in response to a low battery condition in the data transmitter unit, an "old increment" bit 610, an "old decrement" bit 612, a "previous increment" bit 614, a "previous decrement" bit 616, a "current increment" bit 618, a "current decrement" bit 620, a current sequence number 622, and cyclic redundancy check ("CRC") bits 624. Preamble 602 is a bit pattern that precedes the actual data payload of data packet 600. The receiver(s) process preamble 602 to determine the strength of the incoming signal. In response to preamble 602, the receiver(s) are self-initialized and conditioned to improve reception.

The transmitter unit identifier 604 uniquely identifies the wireless data transmitter unit that created and generated the data packet. In the example embodiment, each wireless data transmitter unit is initially registered with the central data processing unit (by simultaneously engaging both the "decrement" and "increment" buttons on the unit), which then associates the respective transmitter unit identifier 604 with a particular inventory item or product. In accordance with one practical embodiment, transmitter unit identifier 604 is a 32-bit pattern, thus enabling the system to support a very large number of distinctly identifiable wireless data transmitter units.

"Current increment" bit 618 and "current decrement" bit 620 represent the current remote sensor data. In the example embodiment, two bits of data are obtained in response to the pressing of one or both buttons on the wireless data transmitter unit: one bit identifies whether the "decrement" button was pressed, and one bit identifies whether the "increment" button was pressed. Consequently, the combination of "current increment" bit and "current decrement" bit represents a single event occurrence "Old increment" bit 610, "old decrement" bit 612, "previous increment" bit 614, and "previous decrement" bit 616 represent historical remote sensor data obtained by the controller before obtaining the current remote sensor data. In other words, these historical data bits represent remote sensor data corresponding to at least one previously detected event occurrence (e.g., a previous selection of the "decrement" or "increment" button). In the example embodiment, the combination of "previous increment" bit 614 and "previous decrement" bit represents the event occurrence immediately preceding the current event occurrence, and the combination of "old increment" bit 610 and "old decrement" bit 612 represents the event occurrence immediately preceding the previous event occurrence.

The transmission of historical remote sensor data in each current data packet is a realization of time diversity via redundancy within the current data packet. Using this technique, historical data can be recovered by the receiver(s) or by the central data processing unit if one or more packets are not received by the receiver(s). In the example embodiment where the current remote sensor data is packaged with two immediately preceding sets of historical remote sensor data, each data packet is "overlapping" and redundant with the two prior packets in time such that the remote sensor data corresponding to any given event occurrence is contained in three sequential data packets. Thus, even if two of three sequential data packets are not received properly, the receiver(s) can recover the historical data.

Current sequence number 622 represents a running count of detected event occurrences. In the practical embodiment, current sequence number 622 has an 8-bit resolution, and it rolls back to count zero after the maximum count has been reached. In the example system described herein, current sequence number 622 is incremented whenever the controller detects that the "decrement" button and/or the "increment" button has been selected by the user. Thus, if the user removes four items from a storage area and presses the respective "decrement" button four times, current sequence number 622 will advance four times. If, immediately thereafter, the user adds three items to the same storage area and presses the respective "increment" button three times, current sequence number 622 will advance three more times.

CRC bits 624 are utilized to check the integrity of the data contained in data packet 600. The wireless data transmitter unit can employ any suitable CRC algorithm and technique to generate the CRC bits. In the example embodiment, the controller appends 16 CRC bits to the end of data packet 600. The 16 bit CRC polynomial used in the preferred embodiment is $X^{15}+X^4+X^2+X^1$ with an initial seed value of 0xFF00 (in hexadecimal notation).

FIGS. 7–9 depict a transmit sequence of three example data packets, where data packet 626 represents the first data packet in the sequence, data packet 628 represents the second data packet in the sequence, and data packet 630 represents the third and current data packet in the sequence. The three data packets 626/628/630 are all created by the same wireless data transmitter unit (for the sake of illustration, these data packets contain a common transmitter unit identifier: 158). For purposes of this example, the historical sensor data contained in data packet 626 is irrelevant, as indicated by the "X" bits contained in the historical sensor data bit positions. The "current increment" bit and "current decrement" bit, however, are "0" and "1," respectively, and the current sequence number is 55 in this example. The previously current remote sensor data has been shifted in the next data packet 628; the "previous increment" bit and "previous decrement" bit are "0" and "1," respectively. In addition, the "current increment" bit and "current decrement" bit in data packet 628 ("0" and "1," respectively) represent newly detected remote sensor data. Notably, the current sequence number in data packet 628 has been incremented to the new value of 56. In data packet 630, the historical remote sensor data has again been shifted such that the "current" data from data packet 626 occupies the "old increment" and "old decrement" bit positions, and such that the "current" data from data packet 628 occupies the "previous increment" and "previous decrement" bit positions. In addition, the "current increment" bit and "current decrement" bit in data packet 630 ("1" and "0," respectively) represent the currently detected remote sensor data, and the current sequence number in data packet 630 has been incremented to the new value of 57.

In operation, a wireless data transmitter unit generates a data packet (formatted as described above) in response to an event occurrence and transmits identical copies of the data packet to increase the reliability of the transmission. The controller and/or the transmitter arrangement utilized by the wireless data transmitter unit can be designed to accommodate a number of different data packet transmission schemes. The particular transmission protocol may depend upon the specific application, the number of transmitter units, the ambient noise level, the range of the transmitter units, and other deployment-specific variables.

Figure 10:
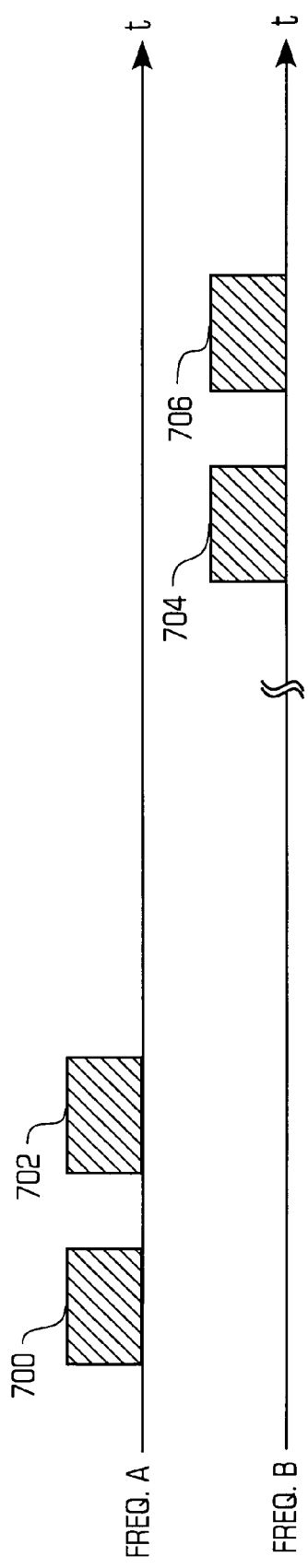
FIG. 10 is a timing diagram depicting the sequential transmission of data packets at two different carrier frequencies.

For example, FIG. 10 is a timing diagram depicting the sequential transmission of data packets at two different carrier frequencies. FIG. 10 depicts the manner in which the preferred embodiment transmits data packets. The wireless data transmitter unit transmits a first identical copy of the data packet 700 using a first carrier frequency (labeled frequency A). After the wireless data transmitter unit transmits data packet 700, it transmits a second identical copy of the data packet 702 using the first carrier frequency. After the wireless data transmitter unit transmits data packet 702, it transmits a third identical copy of the data packet 704 using a second carrier frequency (labeled frequency B). After the wireless data transmitter unit transmits data packet 704, it transmits data packet 706 using the second carrier frequency. Although not shown in FIG. 10, the transmission protocol can be extended to any number of distinct carrier frequencies and to any number of data packets sequentially transmitted at any given carrier. The transmission scheme depicted in FIG. 10 takes advantage of the benefits of time diversity by transmitting identical data packets sequentially in time. The transmission scheme depicted in FIG. 10 also takes advantage of the benefits of frequency diversity by transmitting identical data packets using a plurality of different carrier frequencies. In contrast to conventional spread spectrum techniques that utilize a large number of frequencies to spread incremental pieces of data over a wide spectrum, the transmission schemes described herein distribute entire data packets or messages using a relatively small number of narrowband frequencies.

Figure 11:
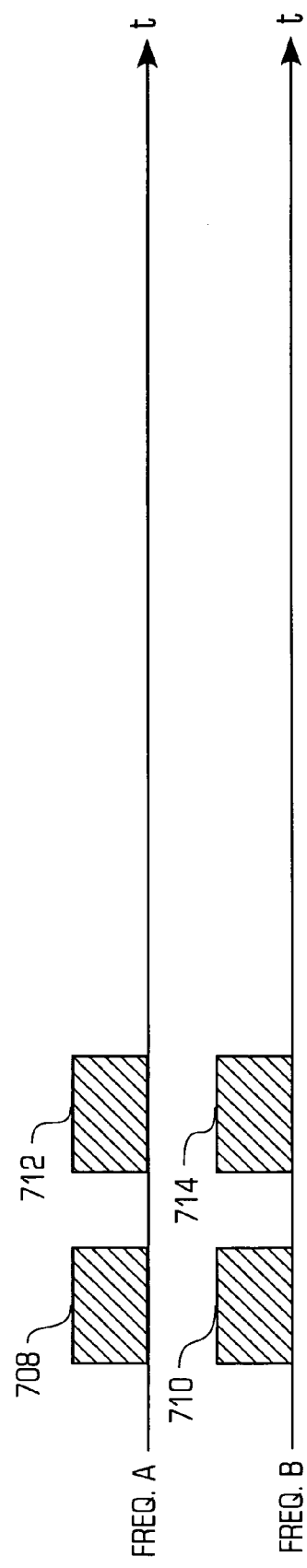
FIG. 11 is a timing diagram depicting the simultaneous transmission of data packets at two different carrier frequencies.

FIG. 11 is a timing diagram depicting the simultaneous transmission of identical data packets at two different carrier frequencies. FIG. 11 depicts the manner in which an alternate embodiment transmits identical copies of the data packets. The wireless data transmitter unit simultaneously transmits a first identical copy of the data packet 708 using a first carrier frequency, and a second identical copy of the data packet 710 using a second carrier frequency. Thereafter, the same wireless data transmitter unit simultaneously transmits a third identical copy of the data packet 712 using the first carrier frequency, and a fourth identical copy of the data packet 714 using the second carrier frequency. Although not shown in FIG. 11, this transmission scheme can be extended to any number of distinct carrier frequencies and to any number of data packets sequentially transmitted at any given carrier. The transmission scheme depicted in FIG. 11 also takes advantage of the benefits of time and frequency diversity.

FIG. 12 is a timing diagram depicting the transmission of data packets at two different alternating carrier frequencies and at distinct times. FIG. 12 depicts the manner in which an alternate embodiment transmits identical copies of the data packets. The wireless data transmitter unit transmits a first identical copy of the data packet 716 using a first carrier frequency. After the wireless data transmitter unit transmits data packet 716, it transmits a second identical copy of the data packet 718 using a second carrier frequency. Following the transmission of data packet 718, the same wireless data transmitter unit transmits a third identical copy of the data packet 720 using the first carrier frequency. Thereafter, the same wireless data transmitter unit transmits a fourth identical copy of the data packet 722 using the second carrier frequency. Although not shown in FIG. 12, this transmission scheme can be extended to any number of alternating carrier frequencies and to any number of data packets transmitted at any given carrier. Like the transmission protocols described above, the transmission scheme depicted in FIG. 12 also takes advantage of the benefits of time and frequency diversity.

FIG. 13 is a timing diagram depicting the transmission of data packets at two different alternating carrier frequencies and at overlapping times. FIG. 13 depicts the manner in which an alternate embodiment transmits identical copies of the data packets. The transmission scheme depicted in FIG. 13 is similar to that shown in FIG. 12, however, at least a portion of the first data packet 724 and at least a portion of the second data packet 726 are transmitted concurrently. Likewise, at least a portion of the third data packet 728 and at least a portion of the fourth data packet 730 are transmitted concurrently.

Referring again to FIG. 4 and FIG. 5, controller 404 may be implemented as one or more discrete components configured to perform the various data packet formatting processes described herein. In accordance with the preferred practical embodiment, controller 404 is realized as a single chip microcontroller, which functions as a digital processor and microcomputer. Alternatively, controller 404 can be realized in the form of an embedded controller that is built into the circuit board utilized by wireless data transmitter unit 400. In practice, controller 404 is programmed with executable instructions such that it can implement the techniques described herein, e.g., data packet formatting and packet transmission processes. In this regard, controller 404 may leverage known microprocessor control technologies and/or known microprocessor programming techniques.

In the preferred embodiment, controller 404 is a single integrated circuit that includes a clock circuit, a central processing element, memory, and input/output functions (the general design and operation of such single-chip microcontrollers are known to those skilled in the art). In an alternate configuration, a single-chip device includes controller 404, the transmitters, and the matching circuits.

Figure 14:
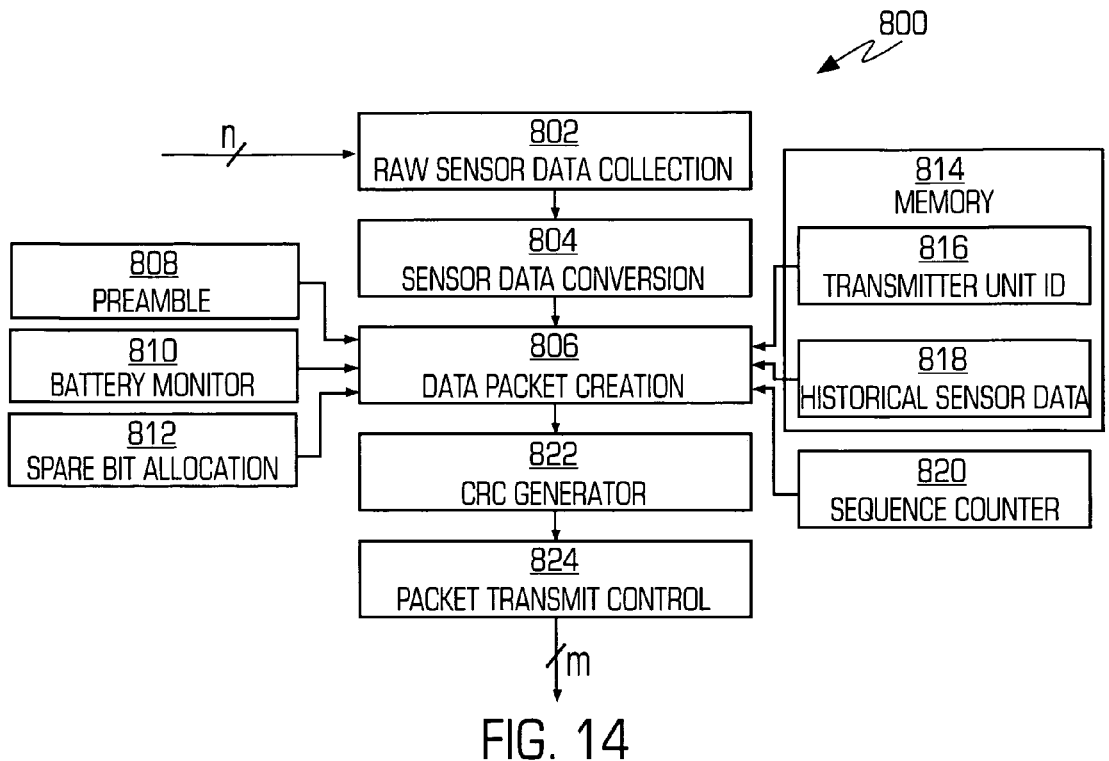
FIG. 14 is a schematic representation of a controller suitable for use with a wireless data transmitter unit.

FIG. 14 is a schematic representation of a controller 800, which is suitable for use as controller 404. The blocks in FIG. 14 represent functional elements of controller 800, features of controller 800, and/or operations, processes, or functions performed by controller 800 under the control of programmed instructions or executable software code (as described in more detail herein). Controller 800 includes a feature or function 802 for collecting the raw sensor data. FIG. 14 indicates that controller 800 can process any number (n) of raw sensor signals. Controller 800 may also include a feature or function 804 that converts the raw sensor data/signal into a usable format, e.g., digital data. Of course, such sensor data conversion need not be performed if the raw sensor data is already in a usable format.

Controller 800 includes a feature or function 806 that governs the creation and formatting of data packets. As depicted in FIG. 14, the data packet creation element 806 receives information from a number of "sources," and generates a data packet that contains such information. In this regard, controller 800 may include at least the following features or functions: a preamble generator 808, which may generate different preambles as needed or provide a stored preamble to data packet creation element 806; a battery (or other power supply) monitor 810, which provides data indicative of the strength of the battery used by the wireless data transmitter unit; and a spare bit allocator 812 designed to reserve one or more unused spare bit locations in the data packet.

Controller 800 may also include or communicate with a suitable memory element 814. Memory element 814 can store the unique transmitter unit identifier 816 associated with the wireless data transmitter unit, historical remote sensor data 818, and other data as necessary. As described above, the transmitter unit identifier 816 is fixed for each transmitter unit, while the historical remote sensor data 818 is preferably updated after each detected event occurrence. Data packet creation element 806 also receives this information for addition to the data packet.

Controller 800 may employ a feature or function 822 for generating CRC bits in response to the data payload in the packet. In the example embodiment, CRC generator 822 appends the CRC bits to the end of the data packet, as depicted in FIG. 6. At this point, controller 800 may store the data packet or make identical copies of the data packet for transmission. Controller 800 may include a feature or function 824 that controls the transmission of data packets. Packet transmit control element 824 is suitably configured to accommodate the desired data packet transmission scheme utilized by the wireless data transmitter unit (see FIGS. 10–13 for example transmission schemes). FIG. 14 indicates that controller 800 can provide any number (m) of identical data packets corresponding to a single event occurrence. The data packets are provided to the transmitter arrangement, which performs the actual wireless transmission of the data packets.

Figure 15:
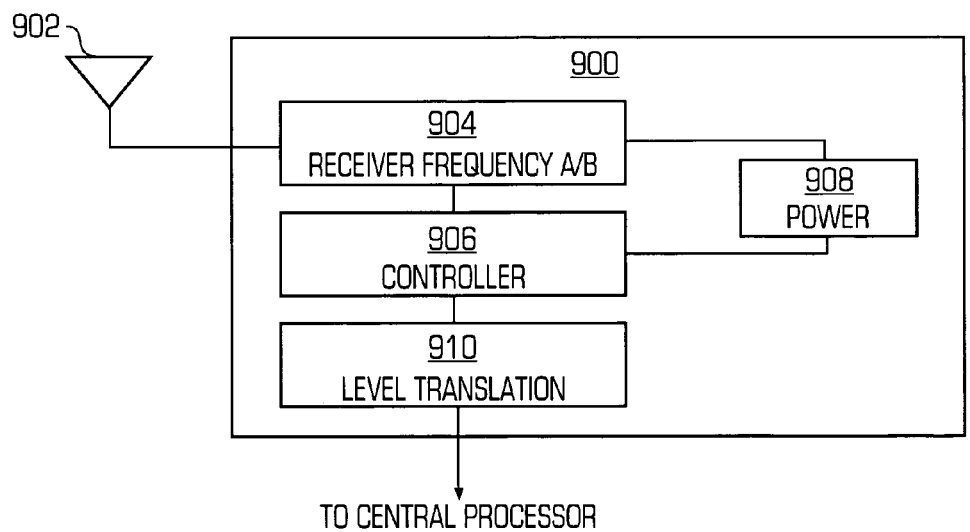
FIG. 15 is a schematic representation of a receiver configured to receive sensor data via a wireless link.

The data packet transmission schemes described above can be utilized to increase the reliability of the transmission between the plurality of wireless data transmitter units and the receiver(s). One practical implementation employs distinct receiver components (each one tuned to receive data packets on a specific carrier frequency). Consequently, each of the receivers operates independently and without knowledge of the other receiver. In this regard, FIG. 15 is a schematic representation of a receiver 900 configured to receive sensor data via a wireless link. Receiver 900 is suitable for use as receiver 114 and/or receiver 116 (see FIG. 1). A wireless data receiving arrangement that supports a plurality of wireless data transmitter units can include any number of distinct and physically separate receivers 900. Receiver 900 generally includes an antenna 902, a receiver element 904, a controller 906, a power source 908, and a level translation element 910. Antenna 902 is coupled to receiver element 904, which is also coupled to controller 906 and to power source 908. Controller 906 is coupled to power source 908 and to level translation element 910. Depending upon the particular implementation, power source 908 may be an integral supply, such as a battery, or it may receive power from an external source, such as a 120 volt AC source.

Antenna 902 is suitably configured to optimize the reception of data packets transmitted on the specified carrier frequency. In this regard, antenna 902 may be a monopole or dipole electric field antenna or a magnetic field loop antenna. In the preferred embodiment, antenna 902 is a wire or conductive structure separate from the circuit board upon which the receiver components reside. Alternatively, antenna 902 can be realized as a conductive trace on the receiver circuit board.

Receiver element 904 is configured to receive, on a specified carrier frequency, data packets containing remote sensor data. For consistency with the example embodiment, FIG. 15 depicts that receiver element 904 can receive data packets transmitted on frequency A or frequency B. Receiver element 904 may employ conventional RF receiver features and elements and utilize conventional RF receiver processes and techniques to receive the data packets. Receiver element 904 converts the information imposed on the carrier frequency into a form that the controller 906 can use to convert and decode the signal into a form equivalent to the originally transmitted data packets. Receiver element 904 is capable of receiving data packets in the manner in which they were transmitted. In other words, receiver element 904 is configured to accommodate the particular data packet transmission scheme utilized by the wireless data transmitter unit.

In the preferred embodiment, receiver element 904 is a single integrated circuit superheterodyne unit, with a single local oscillator. The received signal is converted to a binary digital signal by means of an analog comparator. Alternate embodiments include a plurality of local oscillators, direct conversion, zero intermediate frequency, or a super-regenerative receiver. Further, in another embodiment, the analog comparator may be replaced by one or a plurality of analog-to-digital converters.

Briefly, controller 906 obtains the data packet received by receiver element 904, extracts the information from the data packet, and processes the information in an appropriate manner. Level translation element 910 obtains the extracted information (or the entire data packet in an alternate embodiment) and reformats the information for compatibility with an interface protocol. For example, level translation element 910 may format the information to accommodate an RS232 serial data bus, a USB connection, a parallel data bus architecture, or the like. As depicted in FIG. 15, the output of level translation element 910 is routed to the central data processing unit of the system.

Figure 16:
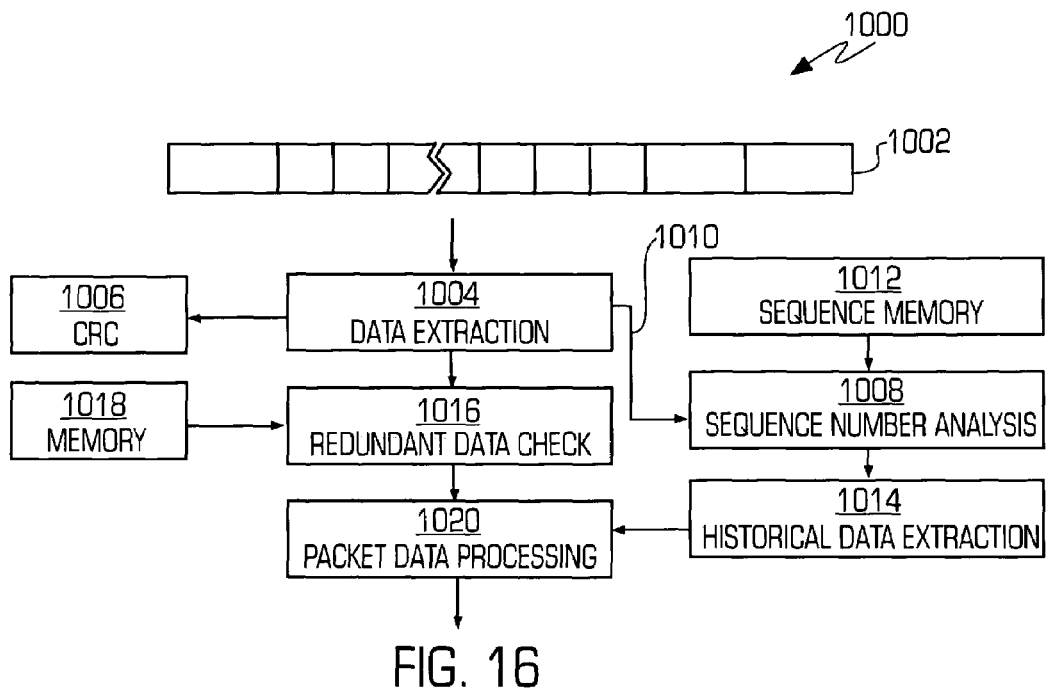
FIG. 16 is a schematic representation of a controller suitable for use with a receiver arrangement.

FIG. 16 is a schematic representation of a controller 1000, which is suitable for use as controller 906. The blocks in FIG. 16 represent functional elements of controller 1000, features of controller 1000, and/or operations, processes, or functions performed by controller 1000 under the control of programmed instructions or executable software code (as described in more detail herein). Controller 1000 obtains the data packet 1002 from a receiver element and performs data extraction 1004 to extract data from the received data packet 1002. Controller 1000 may include a feature or function 1006 for performing a CRC process on the CRC bits contained in the data packet 1002. The CRC process determines whether the contents of data packet 1002 were corrupted in transit. If the CRC process determines that the data packet 1002 contains errors, then controller 1000 may discard the data packet 1002. Otherwise, controller 1000 proceeds with the analysis and processing of the data packet 1002.

Controller 1000 may also include a feature or function 1008 that analyzes the current sequence number 1010 contained in the data packet 1002. In this regard, controller 1000 analyzes the current sequence number 1010 to determine whether a previously transmitted was received. To support this function 1008, controller 1000 may employ a sequence number memory element (or a sequence number counter) 1012 that identifies the sequence number of one or more previously received data packets. Thus, controller 1000 can compare the current sequence number 1010 to one or more previous sequence numbers to determine whether the current sequence number 1010 is out of sequence. If the current sequence number is out of sequence, then controller 1000 can assume that data packets corresponding to one or more event occurrences were not properly received.

Controller 1000 may include a feature or function 1014 that extracts or otherwise processes historical remote sensor data contained in the data packet 1002. This function 1014 is preferably performed if controller 1000 determines that the current sequence number 1010 is out of sequence. In this manner, controller 1000 recovers the remote sensor data corresponding to one or more previously transmitted data packets. In the example embodiment described herein (see FIGS. 7–9), controller 1000 can recover historical sensor data corresponding to the two previous event occurrences.

Controller 1000 may also include a feature or function 1016 that checks for redundant data received by receiver 900. As described above, a wireless data transmitter unit may transmit a plurality of data packets, each having identical content. The redundant data check function 1016 may interrogate a suitably configured memory element 1018 that stores previously received data packets and/or sensor data extracted from previously received data packets. If redundant data or redundant data packets have been received, the controller 1000 may discard or disregard the redundant information, which need not be processed by the central data processing unit.

Controller 1000 may utilize a feature or function 1020 that processes the relevant packet data, e.g., the current sensor data and, if applicable, historical sensor data. This function 1020 may also process the transmitter unit identifier and the low battery bit if the central data processing unit has a need for such information.

Regarding the example system that employs two distinct receivers, each receiver is positioned such that the distance between the respective antennas is at least one-eighth of the wavelength of the carrier frequency having the longest wavelength. Locating a plurality of receivers or antennas separated from each other reduces the probability that all receivers will be impaired simultaneously. For example, signal impairments, such as multiple propagation paths, that effectively cancel the signal, and obstructions that impede the propagation of electromagnetic waves are unlikely to occur simultaneously at a plurality of physical locations in the operating environment.

Figure 17:
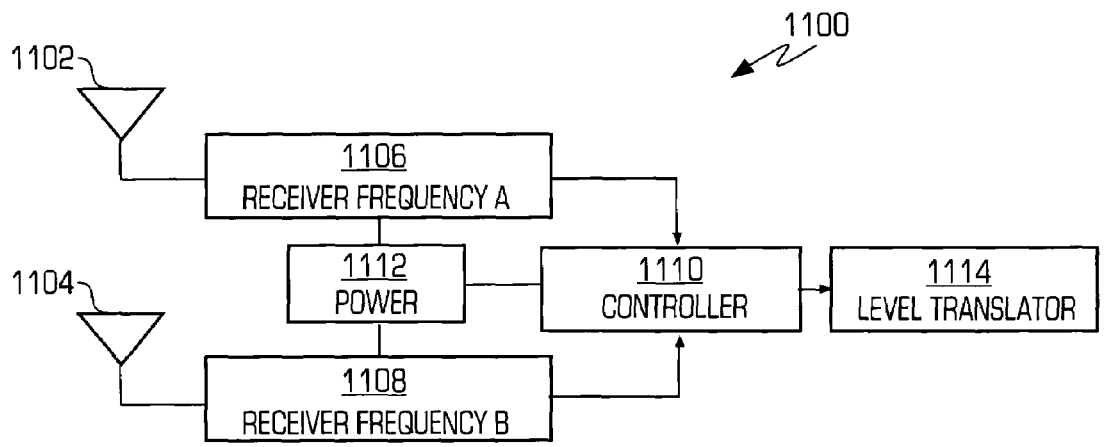
FIG. 17 is a schematic representation of an alternate receiver configured to receive sensor data via a wireless link.

An alternate receiver arrangement employs co-located receiver components housed in a single integrated unit. Although each of the receiver elements operates independently and without knowledge of the other receiver element, the outputs of the receiver elements may be processed by one or more shared features, components, or functions. In this regard, FIG. 17 is a schematic representation of an alternate receiver 1100 configured to receive sensor data via one or more wireless links. Although only two receiver channels are depicted in FIG. 17, a wireless data receiving arrangement that supports a plurality of wireless data transmitter units can include any number of receiver channels. Receiver 1100 generally includes an antenna structure, which may include a first antenna 1102 and a second antenna 1104, a first receiver element 1106 configured to receive data packets on a first carrier frequency, a second receiver element 1108 configured to receive data packets on a second carrier frequency, a controller 1110, a power source 1112, and a level translation element 1114. Antenna 1102 is coupled to receiver element 1106, which is also coupled to controller 1110 and to power source 1112. Likewise, antenna 1104 is coupled to receiver element 1108, which is also coupled to controller 1110 and to power source 1112. Controller 1110 is coupled to power source 1112 and to level translation element 1114. The components of receiver 1100 generally function as described above in connection with receiver 900.

Controller 1110, in addition to the functions described above in connection with controller 1000, processes data packets received on more than one carrier frequency. Once the data packets have been received by controller 1110, however, the carrier frequency upon which they were transmitted is irrelevant information.

Receiver 1100 is suitably configured to maintain a particular spatial relationship between first antenna 1102 and second antenna 1104. As described above, the preferred practical embodiment is arranged such that the distance between antennas 1102/1104 is at least one-eighth of the wavelength of the carrier frequency having the longest wavelength.

The wireless data transmission and reception techniques described herein may simultaneously employ different types of communication diversity in applications (such as a wireless inventory control system, garage door openers, wireless security systems, climate control systems, and the like) that traditionally employ single frequency carrier communication techniques. Conventional narrowband wireless data communication techniques can be unreliable, especially in a noisy environment having an undesirable amount of electromagnetic interference. In contrast to conventional spread spectrum applications that realize high coding gain for secure data transmission, the data transmission techniques described herein utilize a small number of narrowband frequencies (e.g., less than ten discrete frequencies). Traditional spread spectrum techniques utilize a very large number of transmit frequencies and the rate of frequency switching far exceeds the packet or message transmission rate. Indeed, conventional spread spectrum techniques transmit only single bits (or a small number of bits) at each frequency, thus dividing each data packet or message for transmission over a large number of carrier frequencies. The data transmission techniques described herein increase the reliability of the system without adversely affecting the complexity, cost, or efficiency of the transmitter and receiver components.

Figure 18:
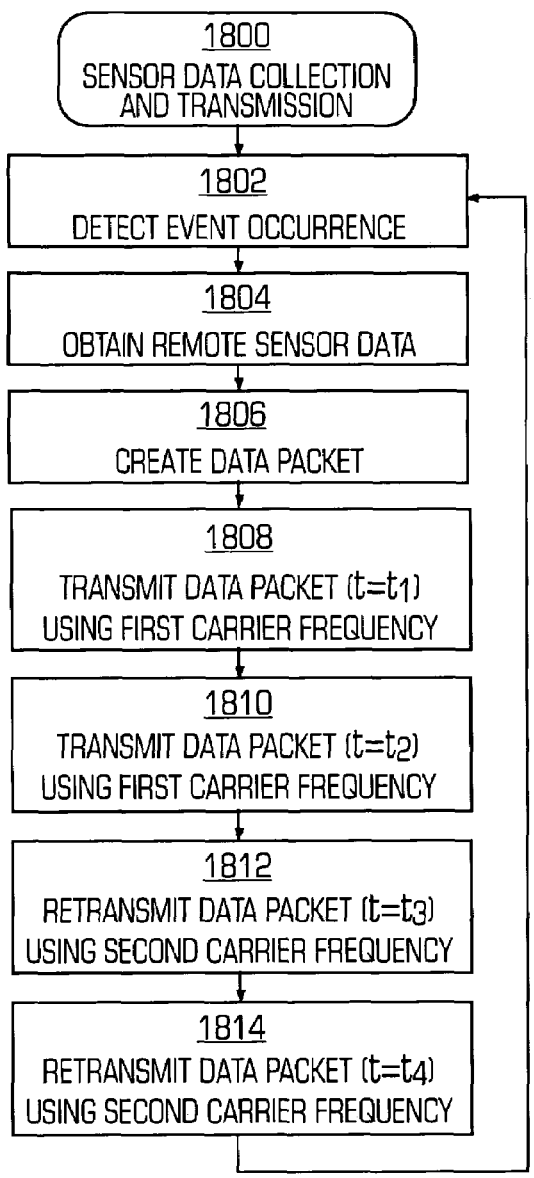
FIG. 18 is a flow diagram of a sensor data collection and transmission process that can be performed by a wireless data transmitter unit.
Figure 19:
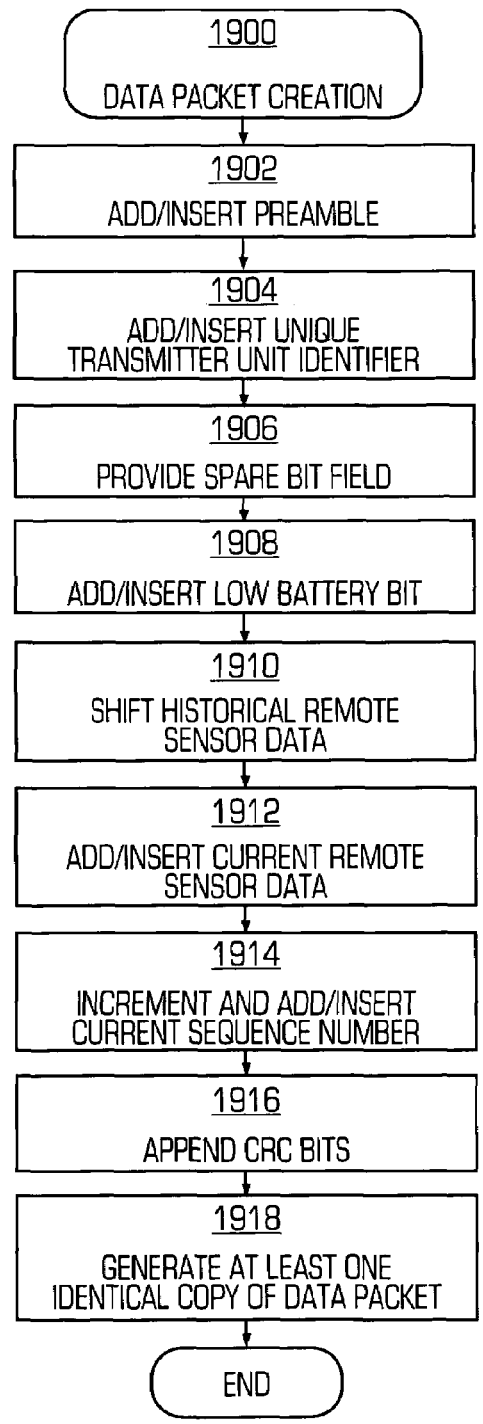
FIG. 19 is a flow diagram of a data packet creation process that can be performed by a wireless data transmitter unit.

FIGS. 18–20 are flow diagrams that depict various processes corresponding to the operation of an example system. Unless otherwise noted, a practical embodiment need not perform the various process tasks in the illustrated order. Furthermore, a practical embodiment may perform any number of additional and/or alternative process tasks other than those shown in the flow diagrams. In this regard, the individual processes described herein may be implemented as a portion of one or more "larger" processes associated with the operation of a wireless data collection and processing system.

FIG. 18 is a flow diagram of a sensor data collection and transmission process 1800 that can be performed by a wireless data transmitter unit (as described herein). Process 1800 begins when a sensor, switch, or other transducer detects an event occurrence (task 1802). The transducer output may be processed to obtain remote sensor data (task 1804) having a format suitable for use with a data packet. The remote sensor data and other information are processed to create a data packet (task 1806) having a specific format. An example data packet creation process is described in more detail below.

In accordance with the preferred practical embodiment, the transmitter unit transmits a first identical copy of the data packet (created during task 1806) using a first carrier frequency (task 1808). In this example, task 1808 occurs at a time $t=t_1$. Thereafter, the transmitter unit transmits a second identical copy of the data packet using the first carrier frequency (task 1810). In this example, task 1810 occurs at a time $t=t_2$. Thereafter, the transmitter unit transmits a third identical copy of the data packet using the second carrier frequency (task 1812). In this example, task 1812 occurs at a time $t=t_3$. Thereafter, the transmitter unit transmits a fourth identical copy of the data packet using the second carrier frequency (task 1814). In this example, task 1814 occurs at a time $t=t_4$. Notably, process 1800 results in the data transmission pattern depicted in FIG. 10.

FIG. 19 is a flow diagram of a data packet creation process 1900 that can be performed by a wireless data transmitter unit. Process 1900 may be performed to generate any suitably formatted data packet, e.g., data packet 600 (see FIG. 6), in response to a detected event occurrence. Process 1900 may be performed during task 1806 of sensor data collection and transmission process 1800. For the sake of illustration, this description refers to the "adding" or "inserting" of data into the data packet format. It should be appreciated that, in reality, the wireless data transmitter unit need not begin with an "empty" data packet that is "filled" with data during process 1900. Indeed, a practical embodiment may simply process the data in a concurrent manner and generate the data packet in a single step.

Process 1900 may begin by adding or inserting the preamble data to the data packet format (task 1902). In addition, process 1900 adds or inserts the transmitter unit identifier to the data packet format (task 1904). One or more bits representing a spare bit field may be provided (task 1906), and one or more "low battery" bits can be added to the data packet format (task 1908).

Process 1900 may perform a task 1910 to "shift" historical remote sensor data within the data packet such that a limited number of previously obtained sensor data sets can be conveyed in the current data packet. As described above in connection with FIG. 6, a data packet may contain the current remote sensor data and the remote sensor data corresponding to a number of past event occurrences. The wireless data transmitter unit also adds or inserts the current remote sensor data into the data packet format (task 1912).

The wireless data transmitter unit may increment the current transmit sequence number (task 1914) and add or insert the updated sequence number into the data packet format. Thereafter, a CRC process may be performed and the resultant CRC bits can be appended to the data packet (task 1916). Once the data packet has been created, the wireless data transmitter unit can generate one or more identical copies of the data packet to accommodate a suitable transmission scheme.

FIG. 20 is a flow diagram of a receiver process 2000 that may be performed by a receiver arrangement configured to receive data packets in the manner described above. For consistency with the example embodiment, process 2000 contemplates the reception of the data packets transmitted during sensor data collection and transmission process 1800.

In accordance with the example embodiment, the receiver arrangement (which may be implemented by one or more receiver components) receives the first copy of the data packet on the first carrier frequency (task 2002). In this example, task 2002 occurs at a time $t=t_{1'}$ (representing the time that the first data packet was transmitted plus the transmission latency). Thereafter, the receiver arrangement receives the second copy of the data packet on the first carrier frequency (task 2004). In this example, task 2004 occurs at a time $t=t_{2'}$. Thereafter, the receiver arrangement receives the third copy of the data packet on the second carrier frequency (task 2006). In this example, task 2006 occurs at a time $t=t_{3'}$. Thereafter, the receiver arrangement receives the fourth copy of the data packet on the second carrier frequency (task 2008). In this example, task 2008 occurs at a time $t=t_{4'}$.

The receiver arrangement may extract and process the current sequence number (from any of the received data packets) to determine whether a previously transmitted data packets was received (task 2010). If the current sequence number indicates that a previously transmitted data packet was not received (query task 2012), then a task 2014 is performed. Otherwise, task 2014 is bypassed and a task 2016 is performed. During task 2014, the receiver arrangement extracts and processes historical remote sensor data contained in the current data packet(s). As described above, task 2014 enables the receiver arrangement to recover previously transmitted data that was not properly received. During task 2016, the receiver arrangement may discard redundant information contained in the received data packets. Alternatively, the receiver arrangement may discard redundant packets in their entirety.

Receiver process 2000 extracts and processes the current remote sensor data contained in one or more of the received data packets (task 2018). In addition, process 2000 may extract and process other information contained in the data packets, if such information will be transmitted to the central data processing unit. The receiver arrangement may perform level translation and interface formatting during a task 2020, which prepares the sensor data (and possibly other information) for sending to the data processing unit (task 2022). In the example embodiment, the receiver arrangement utilizes standard RS232 serial data communication techniques to send the data to the central data processing unit.

The present invention has been described above with reference to a preferred embodiment. However, those skilled in the art having read this disclosure will recognize that changes and modifications may be made to the preferred embodiment without departing from the scope of the present invention. These and other changes or modifications are intended to be included within the scope of the present invention, as expressed in the following claims.

What is claimed is:

1. A wireless data transmission method comprising:
   detecting an event occurrence;
   obtaining remote sensor data in response to said event occurrence;
   inserting said remote sensor data into a first data packet;
   transmitting the first data packet using a first carrier frequency; and
   transmitting a second data packet containing the remote sensor data using a second carrier frequency;
   wherein the content of said second data packet is identical to the content of said first data packet, and wherein said first data packet further comprises a unique transmitter unit identifier, a current sequence number, and historical remote sensor data obtained before obtaining said remote sensor data.

2. A method according to claim 1, wherein said historical remote sensor data represents remote sensor data corresponding to at least one previously detected event occurrence.

3. A wireless data transmitter unit comprising:
   a controller configured to obtain remote sensor data generated in response to an event occurrence, and to create data packets containing said remote sensor data;
   a number of sensors coupled to said controller and configured to detect said event occurrence; and
   a transmitter arrangement coupled to said controller and configured to transmit at least a first data packet containing said remote sensor data using a first carrier frequency, and a second data packet containing said remote sensor data using a second carrier frequency;
   wherein the content of said second data packet is identical to the content of said first data packet, and wherein said number of sensors comprises a plurality of switches.

4. A wireless data transmitter unit comprising:
   a controller configured to obtain remote sensor data generated in response to an event occurrence, and to create data packets containing said remote sensor data; and
   a transmitter arrangement coupled to said controller and configured to transmit at least a first data packet containing said remote sensor data using a first carrier frequency, and a second data packet containing said remote sensor data using a second carrier frequency;

wherein the content of said second data packet is identical to the content of said first data packet, and wherein said controller is configured to create data packets containing at least said remote sensor data, a unique transmitter unit identifier, a current sequence number, and historical remote sensor data obtained before obtaining said remote sensor data.

5. A wireless data transmitter unit according to claim 4, wherein said historical remote sensor data represents remote sensor data corresponding to at least one previously detected event occurrence.

6. A wireless data reception method comprising:
receiving, on a first carrier frequency, a first data packet containing remote sensor data; and
receiving, on a second carrier frequency, a second data packet containing said remote sensor data, wherein the content of said second data packet is identical to the content of said first data packet;
wherein said first data packet contains at least said remote sensor data, a unique transmitter unit identifier, a current sequence number, and historical remote sensor data.

7. A method according to claim 6, further comprising processing said current sequence number to determine whether a previously transmitted data packet was received.

8. A method according to claim 7, further comprising processing said historical remote sensor data to recover remote sensor data corresponding to a previously transmitted data packet.

9. A wireless data receiving arrangement comprising:
a first receiver element configured to receive, on a first carrier frequency, a first data packet containing remote sensor data; and
a second receiver element configured to receive, on a second carrier frequency, a second data packet containing said remote sensor data, wherein the content of said second data packet is identical to the content of said first data packet
wherein said first data packet and said second data packet each contains at least said remote sensor data, a unique transmitter unit identifier, a current sequence number, and historical remote sensor data.

10. A wireless data receiving arrangement according to claim 9, further comprising a controller configured to process said current sequence number to determine whether a previously transmitted data packet was received.

11. A wireless data receiving arrangement according to claim 10, wherein said controller is further configured to process said historical remote sensor data to recover remote sensor data corresponding to a previously transmitted data packet.

* * * * *